(12) United States Patent
Becker

(10) Patent No.: US 6,367,059 B1
(45) Date of Patent: Apr. 2, 2002

(54) CARRY CHAIN STANDARD CELL WITH CHARGE SHARING REDUCTION ARCHITECTURE

(75) Inventor: Scott T. Becker, San Jose, CA (US)

(73) Assignee: Artisan Components, Inc., Sunnyvale, CA (US)

( * ) Notice: Subject to any disclaimer, the term of this patent is extended or adjusted under 35 U.S.C. 154(b) by 0 days.

(21) Appl. No.: 09/273,580

(22) Filed: Mar. 23, 1999

(51) Int. Cl.[7] .............................................. G06F 17/50
(52) U.S. Cl. ................................ 716/8; 716/2; 716/17; 716/9
(58) Field of Search ............................................. 716/8

(56) References Cited

U.S. PATENT DOCUMENTS

| | | | |
|---|---|---|---|
| 3,956,639 A | 5/1976 | Ramsay | 307/94 |
| 3,956,640 A | * 5/1976 | Rubinstein | 307/205 |
| 4,357,675 A | 11/1982 | Freyman | 364/786 |
| 4,851,714 A | * 7/1989 | Hwang | 307/448 |
| 5,283,760 A | 2/1994 | Chin et al. | 365/189.01 |
| 5,317,204 A | * 5/1994 | Yetter et al. | 307/443 |
| 5,378,940 A | * 1/1995 | Knight, Jr. et al. | 326/21 |
| 5,487,025 A | 1/1996 | Partovi et al. | 364/788 |
| 5,642,324 A | 6/1997 | Ghosh et al. | 365/230.03 |
| 5,680,357 A | 10/1997 | Sung et al. | 365/210 |
| 5,783,480 A | 7/1998 | Seo et al. | 438/599 |
| 5,808,933 A | 9/1998 | Ross, Jr. et al. | 365/156 |
| 5,831,919 A | 11/1998 | Haukness et al. | 365/205 |
| 5,892,725 A | 4/1999 | Lattimore et al. | 365/230.03 |
| 5,917,744 A | 6/1999 | Kirihata et al. | 365/63 |
| 6,144,226 A | * 11/2000 | Fairbanks | 326/113 |

* cited by examiner

Primary Examiner—Matthew S. Smith
Assistant Examiner—A. M. Thompson
(74) Attorney, Agent, or Firm—Martine & Penilla, LLP

(57) ABSTRACT

A standard cell circuit architecture and design is provided by way of this disclosure. The standard cell has a plurality of sub-cells that are designed to function together to generate a result and the plurality of sub-cells have at least one input. The standard cell further includes a protection device connected just before and to the at least one input of the plurality of sub-cells. The protection device is designed to prevent charge sharing with circuitry of another standard cell that may be electrically coupled to the standard cell by way of the at least one input. In a specific application of the standard cell, the standard cell can be designed to be a carry chain standard cell. The carry chain standard cell can then be incorporated as part of a library of cells that may be used by a software synthesis layout tool.

26 Claims, 8 Drawing Sheets

CARRY CHAIN STANDARD CELL WITH CHARGE SHARING REDUCTION ARCHITECTURE

BACKGROUND OF THE INVENTION

1. Field of the Invention

The present invention relates generally to integrated circuits, and more particularly to an integrated circuit design and methods for making the integrated circuit design that can be implemented as a robust high performance standard cell to be used by a synthesis tool.

2. Description of the Related Art

In the design of semiconductor integrated circuits, circuit designers commonly utilize what are known as "standard cells" to achieve a particular circuit response. Standard cells are essentially pre-designed layouts of transistors that are wired to perform a certain type of logical function. By way of example, a company, such as Artisan Components, Inc. of Sunnyvale, Calif., designs standard cell libraries incorporating many different types of standard cells, each for performing a specific type of logical operation or operations. The standard cells of the standard cell library are then used by integrated circuit design engineers in conjunction with modeling software to produce a larger scale circuit design that meets a particular specification.

A popular and most commonly used modeling software is a hardware description language (HDL) named "Verilog" (IEEE Verilog Standard 1364, 1995). Using Verilog as a synthesis tool, designers are able to describe each component of an integrated circuit in terms of its functional behavior as well as its implementation. Once a circuit design using Verilog is complete, the Verilog code is synthesized to generate what is referred to as a "netlist." A netlist is essentially a list of "nets," which specify components (i.e., standard cells) and their interconnections which are designed to meet the circuit design's performance constraints.

The actual placement plan of the standard cells on silicon and the topography of wiring is reserved for a subsequent "layout" stage. In the layout stage, another software tool, commonly referred to as "place and route" software, is used to design the actual wiring that will ultimately interconnect the standard cells together. To do this, each standard cell typically has one or more pins for interconnection with pins of other standard cells. The netlist therefore defines the connectivity between pins of the various standard cells of an integrated circuit device.

Although the design of integrated circuits using specialized software has greatly simplified the design process, this simplicity does not come without a price. For instance, there are several types of high performance circuits that if implemented as standard cells, may cause more harm than good. That is, because standard cells are designed in isolation, i.e., as a single cell that is part of a larger library of standard cells, it is rare and nearly impossible to anticipate when an improper logical interaction will occur between standard cells. Of course, this problem can be overcome if the circuit design was custom designed without the use of a synthesis tool. This would therefore defeat the simplicity of the design process that is afforded by a synthesis tool.

This problem is most prevalent in situations where the standard cell is for a high performance circuit. By way of example, a carry chain (which is commonly used in adders) can be said to be a high performance circuit, which can pose a threat to other logical circuits of adjoining standard cells.

The threat posed by the carry chain is that of "charge sharing." Charge sharing is known to occur when circuitry of adjoining standard cells overwhelm certain input nodes of the carry chain, which would then cause the overwhelming charge to be improperly fed back out to the logic circuitry of the adjoining standard cells. As should be apparent to those skilled in the art, charge sharing in high performance logic designs can have the unfortunate ramification of disrupting the performance of the entire design. This would of course result in substantial losses in re-design time and lost revenues.

To facilitate understanding of the aforementioned problems, FIG. 1A illustrates a block diagram 100 of a ripple carry adder. The ripple carry adder includes a propagate/generate block 102 that is configured to generate a plurality of propagate and generate signals. Propagate and generate blocks are well known to those skilled in the art. In the ripple carry adder, a carry chain 104 is implemented to receive the plurality of propagate and generate signals. The carry chain 104 is further configured to receive a carry-in signal (Cin), and output a carry-out signal (Cout). To complete the arithmetic addition operation, a final sum block 106 is implemented to generate the appropriate summation information of the ripple carry adder 100. The final sum block 106 will generate the final sum using the following Equation 1.

$$\text{Final Sum} = p_0 \text{ XOR } Co\phi \qquad \text{Equation (1)}$$

As is well known, conventional carry chains, such as carry chain 104 are also circuits that introduce a substantial amount of delay during the ripple carry addition operations. To illustrate the type of delays associated with carry chains, FIG. 1B provides an example of a multi-bit carry chain having a plurality of a multiplexers 105. Each multiplexer 105 is configured to receive as inputs a generate signal (i.e., g0), and a carry-in (i.e., Cin) signal. The propagate signal (i.e., p0) is provided as a select to each of the multiplexers 105.

If propagate equals a logical one, the carry chain 104 will be "propagating" the carry into each of the bits slices of the carry chain. When propagate is set equal to a logical zero, the carry chain will be "generating" and the generate signal will be passed through each of the multiplexers 105.

As mentioned above, if the carry chain 104 is implemented as a standard cell, the synthesizing tool may place the carry chain at any location in a design without investigating the possibly of having adverse functional consequences relative to the functionality of other logic circuits of other standard cells. Take for example the Cin and g0 inputs to the first multiplexer 105. If a weak driver were connected to the Cin terminal and a strong driver were connected to the g0 terminal, there may be circumstances where the p0 (select) has a slow ramping transition. Under this scenario, depending upon the implementation of the MUX, the strong driver connected to the g0 terminal could overwhelm the weak driver connected to the Cin terminal. This would therefore cause charge sharing, which has the unfortunate consequence of triggering improper logical responses in circuitry of other standard cells.

A further problem with conventional carry chain designs, such as that of FIG. 1B, is that a substantial amount of delay is introduced at each bit slice of the multi-bit carry chain 104. By way of example, at each multiplexer 105, there will be a two-gate delay. The two-gate delay is then multiplied by the number of bits in the carry chain to provide the final gate delay of the carry chain. This of course will have the downside of severely hampering the performance of the carry chain function and the associated arithmetic addition.

In view of the foregoing, there is a need for a high performance circuit design that is robust enough to be integrated into a standard cell of a standard cell library. The needed high performance circuit design should also be capable of preventing charge sharing with the circuitry of other standard cells that may be integrated together to form a larger scale integrated circuit design.

SUMMARY OF THE INVENTION

Broadly speaking, the present invention fills these needs by providing high performance and robust multi-bit standard cell circuitry and methods for designing the circuitry. It should be appreciated that the present invention can be implemented in numerous ways, including as a process, an apparatus, a system, a computer readable media, a device, or a method. Several embodiments of the present invention are described below.

In one embodiment, a standard cell architecture is disclosed. The standard cell includes a plurality of sub-cells that are configured to function together to generate a result, and the plurality of sub-cells have at least one input. The standard cell also has a polysilicon input gate connected just before and to the at least one input of the plurality of sub-cells. The polysilicon input gate is configured to prevent charge sharing with circuitry of another standard cell that is electrically coupled to the standard cell via the at least one input. In a specific application of the standard cell, the standard cell can be designed to be a carry chain standard cell.

In another embodiment, a method for designing a high performance standard cell is disclosed. The method includes designing a plurality of sub-cells that are configured to function together and generate a result. The plurality of sub-cells are interconnected in order to function together and have at least one input that is communicated through the plurality of sub-cells. The method further includes the design of a polysilicon input that is to be connected to and just before the at least one input of the plurality of sub-cells. The polysilicon input is configured to prevent charge sharing with circuitry that is external to the high performance standard cell and that is electrically coupled to the at least one input.

In still another embodiment, a computer readable media containing program instructions for designing a standard cell is disclosed. The computer readable media includes program instructions for designing a plurality of sub-cells that are configured to function together and generate a result. The plurality of sub-cells are interconnected in order to function together and they have at least one input that is communicated through the plurality of sub-cells. Program instructions are also provided for designing a polysilicon input that is to be connected to and just before the at least one input of the plurality of sub-cells. The polysilicon input is configured to prevent charge sharing with circuitry that is external to the high performance standard cell and that is electrically coupled to the at least one input.

These and other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION OF THE PREFERRED EMBODIMENTS

An invention for high performance and robust multi-bit standard cell circuitry and the method of designing the circuitry is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1A:
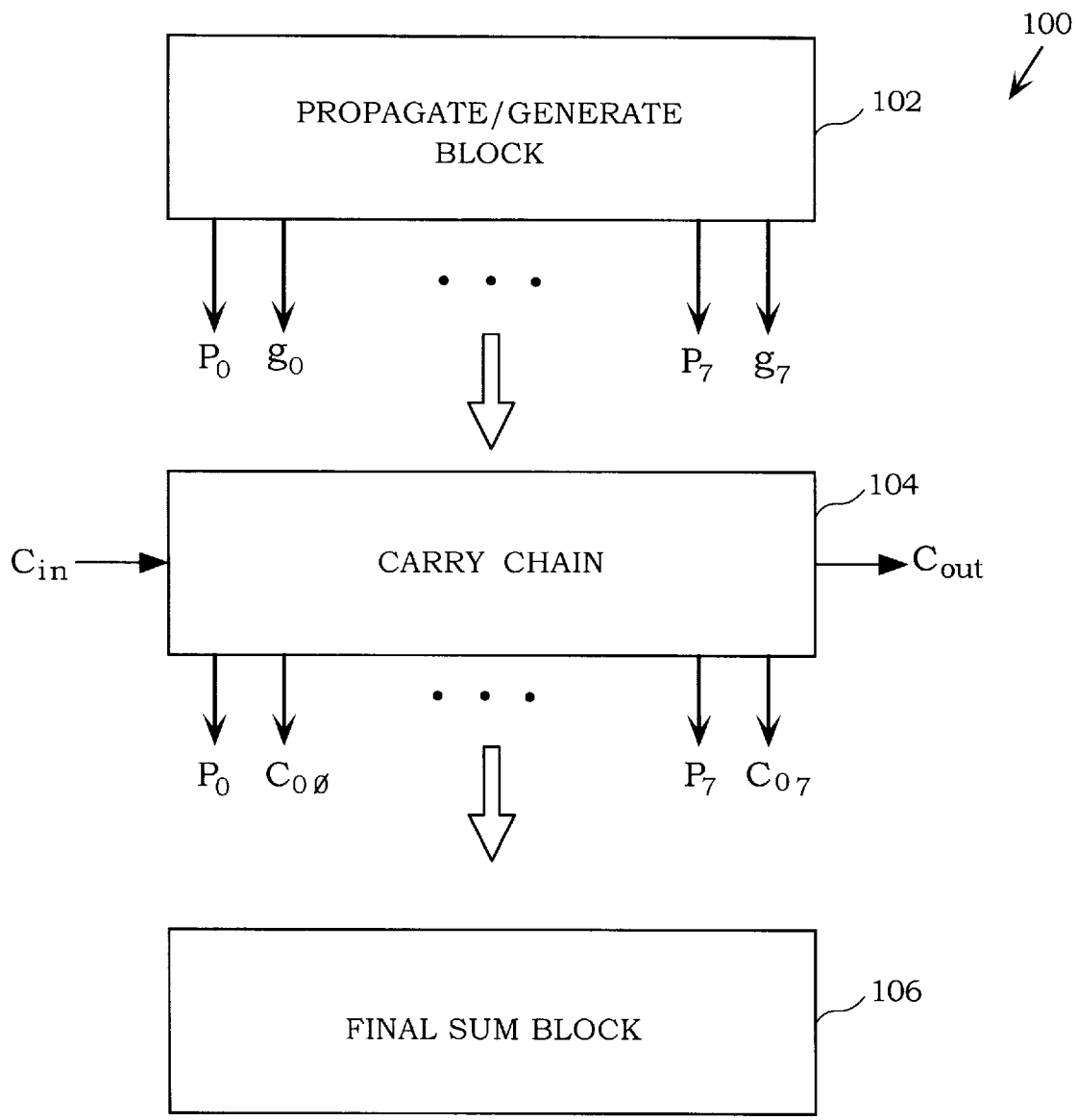
FIG. 1A illustrates a conventional block diagram of a ripple carry adder.
Figure 1B:
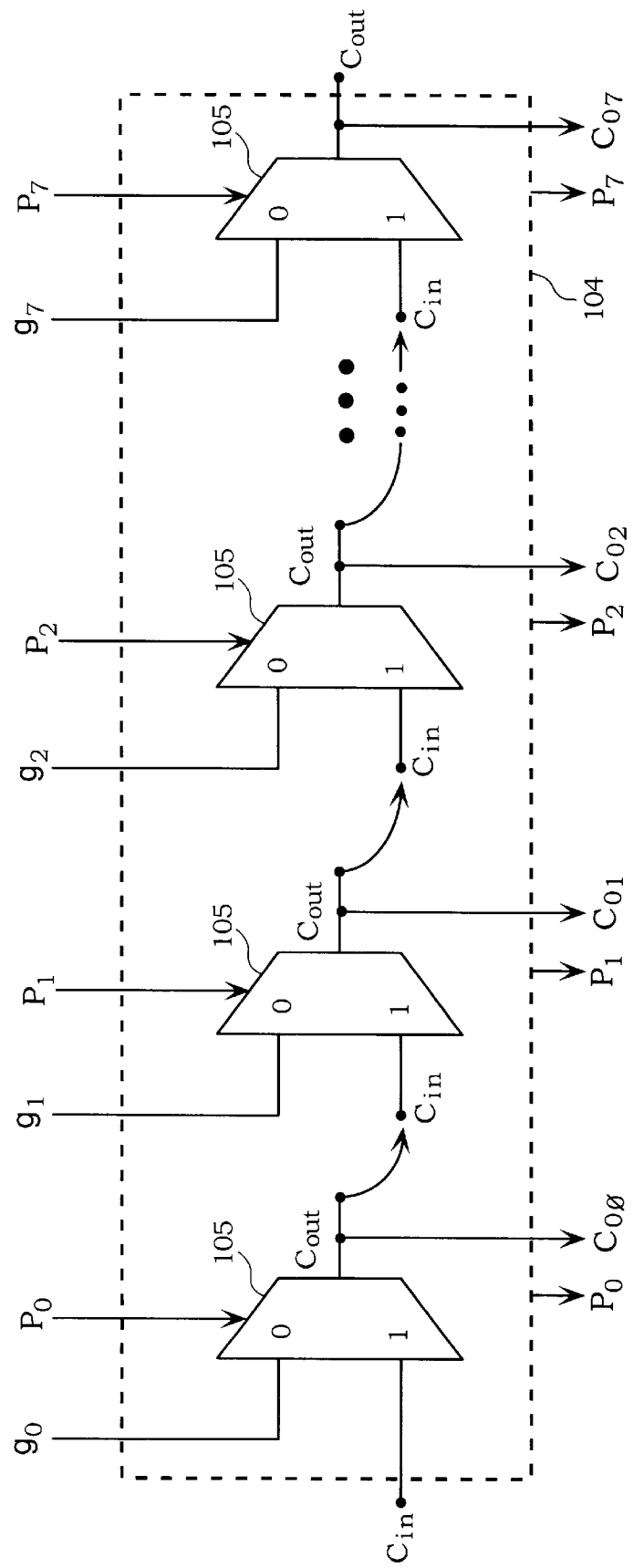
FIG. 1B illustrates a conventional multiplexer carry chain.
Figure 2A:
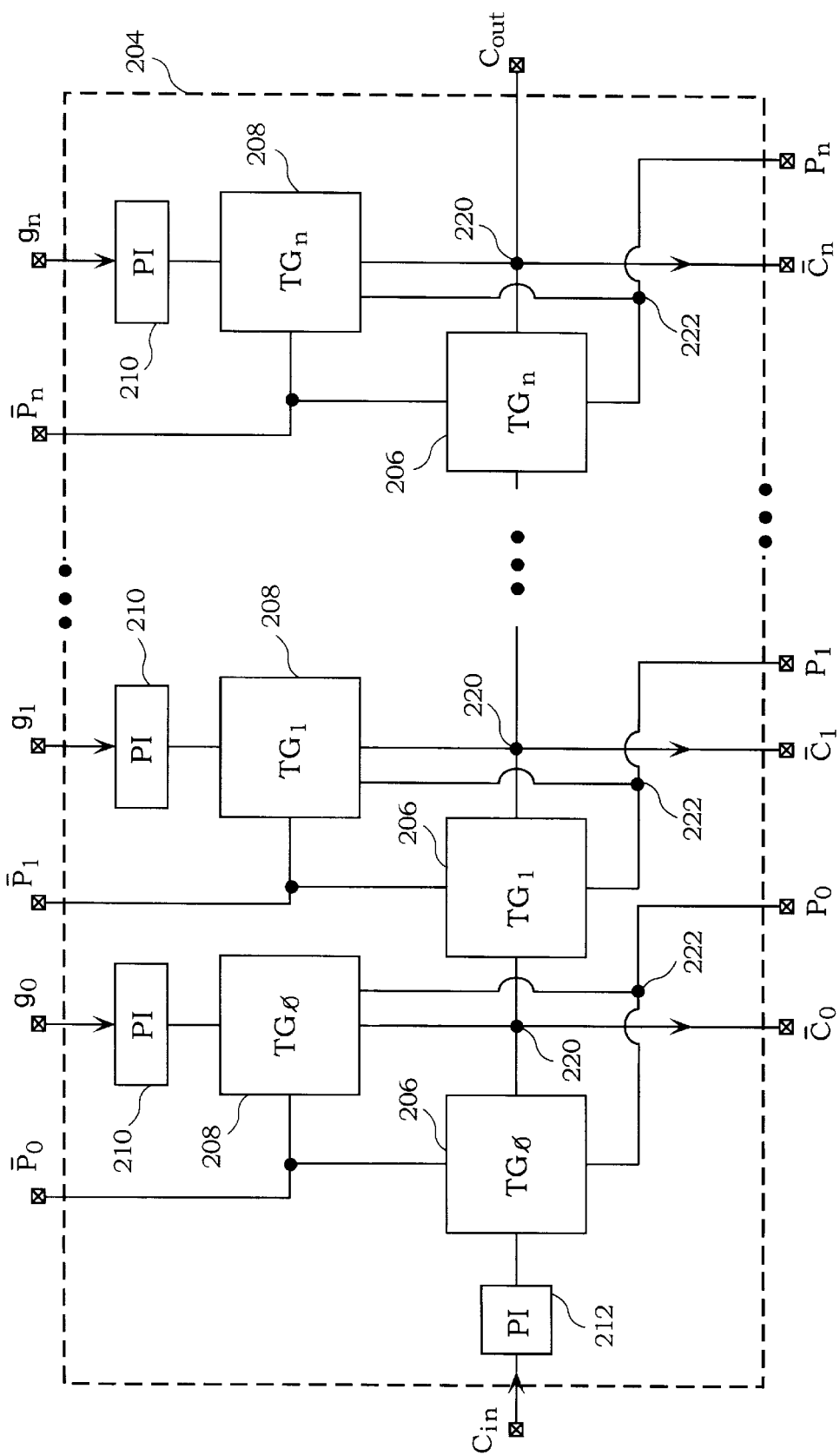
FIG. 2A illustrates a detailed block diagram of a carry chain in accordance with one embodiment of the present invention.

FIG. 2A illustrates a detailed block diagram of a carry chain 204 in accordance with one embodiment of the present invention. It should be understood that the carry chain 204 is a multi-bit carry chain that can be configured to be of any number of bits, for example, it can be a 4-bit carry chain, an 8-bit carry chain, a 16-bit carry chain, a 32-bit carry chain, etc.

Although carry chain designs and implementations will be described with particularity, it should be understood that the teachings of the present invention may be applied to any type of circuit design that has a multiple number of high performance sub-cells that are interdependent on one another. For instance, in a carry chain, each bit slice of a multi-bit carry chain is interdependent on the one before (except for the first) because "carry-in" needs to be propagated through each bit slice of the carry chain. As such, even though this disclosure will describe the benefits and advantages of designing a robust carry chain for use as a library cell, other circuits desirous of these robust integration characteristics can also achieve these benefits and advantages by implementing the teachings herein, which are described by way of example.

Thus, in the example of FIG. 2A, each bit slice of the carry chain will include a first transmission gate 206 and a second transmission gate 208. As is well known, transmission gates have a relatively low delay when signals are propagated from source-to-drain or drain-to-source. Accordingly, the first and second transmission gates 206 and 208 are both configured to transmit signals from source-to-drain and drain-to-source, thereby avoiding the inversion delays associated with gate-to-source or gate-to-drain signal propagation.

The carry-in (Cin) signal is shown being communicated to the multi-bit carry chain 204 at a polysilicon input (PI) gate 212. By intelligently placing this PI 212 at the input of the multi-bit carry chain 204, the aforementioned problems associated with charge sharing is eliminated. The PI 212 will therefore prevent signals from being driven in reverse out from Cin when the input circuitry connected to Cin is overwhelmed by the circuitry connected, for example, to the generate g0 input. In a similar manner, generate g0 input is also provided with a PI 210 that is configured to prevent signals from being driven in reverse out from g0 when the input circuitry connected to g0 is overwhelmed by the circuitry connected, for example, to the Cin. At this point, care should be taken to thoroughly appreciate how each of the inputs of the carry chain 204 are protected with the polysilicon input (PI) gate 212 and the plurality of PIs 210. At the same time, each of the high performance bit slices of the carry chain 204 (i.e., each of the TG 206/TG 208 combinations) are allowed to function in a high performance and robust fashion.

With reference to a one bit slice of the carry chain of FIG. 2A, when the carry is propagating, the /p0 (as a logical one) signal and the p0 (as a logical zero) signal are respectively communicated to the first transmission gate 206 and the second transmission gate 208. In a multi-bit environment, however, the logical states of the /p and the p0 signals are communicated in parallel to each bit slice in the multi-bit carry chain 204. Accordingly, the carry will propagate through each stage of the carry chain with a relatively reduced delay at each stage and thus communicated as a carry-out from the carry chain 204. The sub-carry-outs (/C0 to /Cn) are also shown communicated out from the multi-bit carry chain 204. When the propagate nodes /p and p provide a logical one and a logical zero, respectively, to the first and second transmission gates 206 and 208, the multi-bit carry chain will be in generate mode. When in generate mode, g0 through gn will be communicated in through the polysilicon input gates 210 at each bit slice of the multi-bit carry chain 204.

As can be appreciated from this exemplary charge sharing protected multi-bit carry chain 204, a synthesis tool can now freely implement this carry chain standard cell in any design without the risk of disrupting the logical performance of other interconnected circuits placed by the synthesis tool.

Figure 2B:
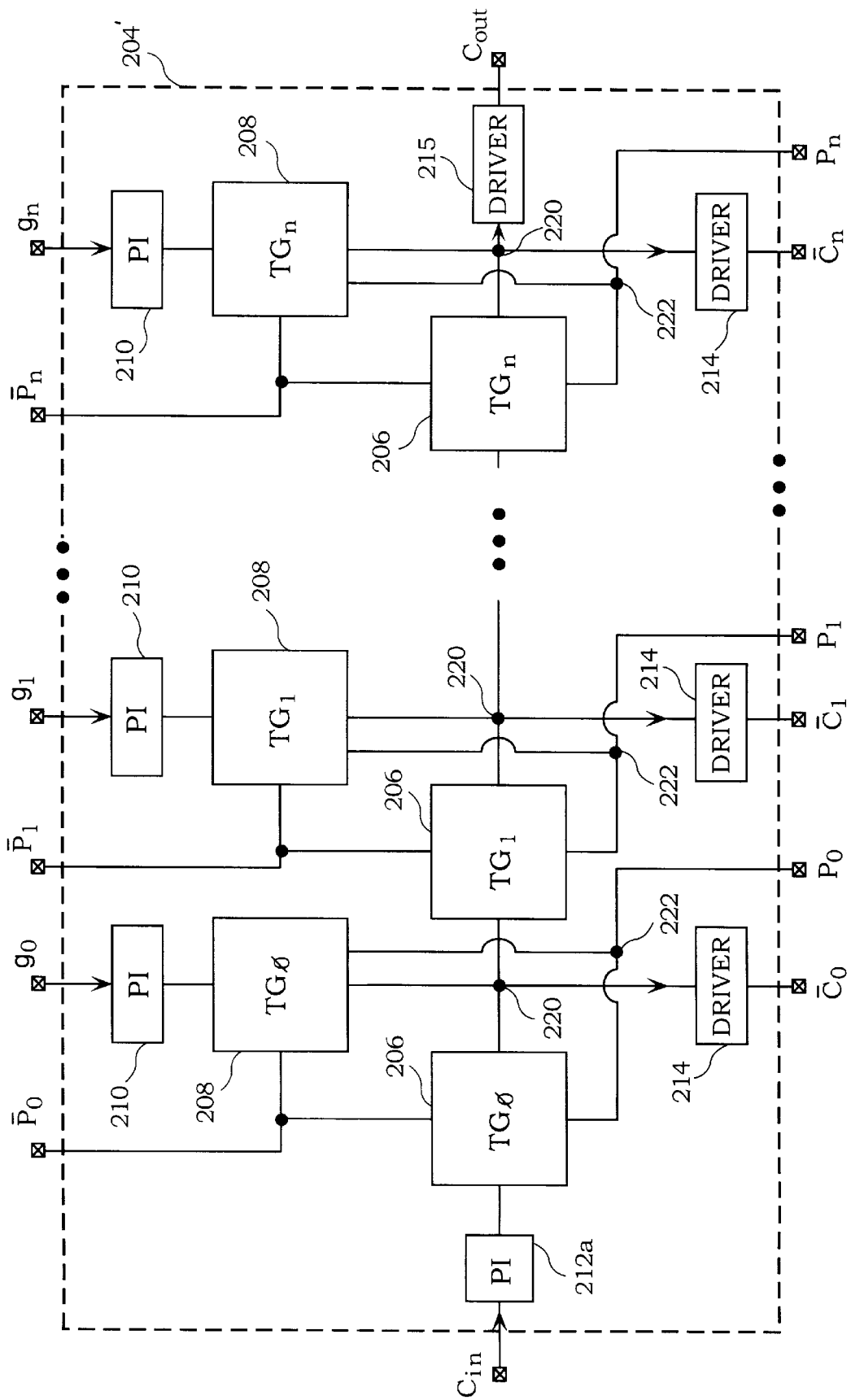
FIG. 2B illustrates another embodiment of a carry chain, which implements additional performance enhancing devices, in accordance with one embodiment of the present invention.

FIG. 2B illustrates another embodiment of a carry chain 204', which implements additional performance enhancing devices, in accordance with one embodiment of the present invention. In this embodiment, each of the sub-carry-out (/Co to /Cn) signals are output through a driver 214. The drivers 214 will therefore provide the output signals with an additional boost when being processed through an adder, for example. A driver 215 may also be provided at the output of the carry chain.

Figure 3:
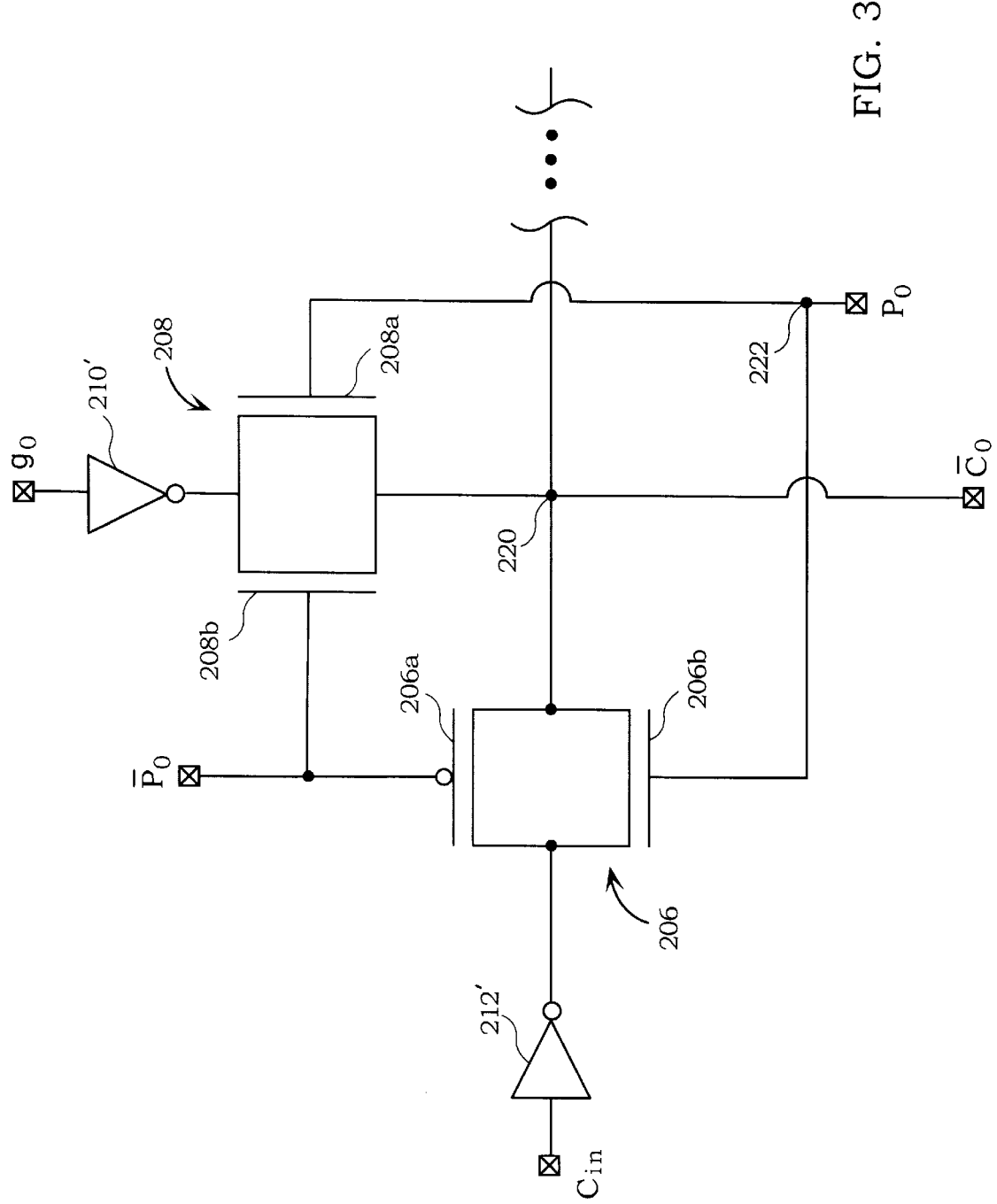
FIG. 3 shows a more detailed illustration of a single bit slice of the multi-bit carry chain of FIG. 2A and 2B, in accordance with one embodiment of the present invention.

FIG. 3 shows a more detailed illustration of a single bit slice of the multi-bit carry chain 204 of FIG. 2A and 2B, in accordance with one embodiment of the present invention. As shown, the first transmission gate 206 is composed of a P-type transistor 206a and an N-type transistor 206b. The transmission gate 208 also includes a P-type transistor 208a and an N-type transistor 208b. Thus, when the carry chain is propagating the carry into this bit slice, /p0 will be set to logical zero and p0 will be set to logical one, which will open transistors 206a and 206b and close transistors 208b and 208a. However, when in the generating mode, /p0 will be set to logical one and p0 will be set to logical zero. When this logical arrangement is provided, transistors 208a and 208b will be open and transistors 206a and 206b will be closed.

In this embodiment, the polysilicon input (PI) gate 212 is shown as an inverter 212', which is well configured to provide the necessary hindrance to charge sharing that may cause improper logical functions in circuitry of other standard cells of a particular design. Further shown is an inverter 210', which will also provide the advantageous functionality of inverter 212'. Accordingly, each internal bit of the multi-bit high performance carry chain will not be able to charge share with external circuits. Now, a synthesis tool can freely plug the multi-bit carry chain into any design (i.e., as a standard cell), without requiring advanced knowledge of what circuitry is interfacing with the carry chain.

Figure 4:
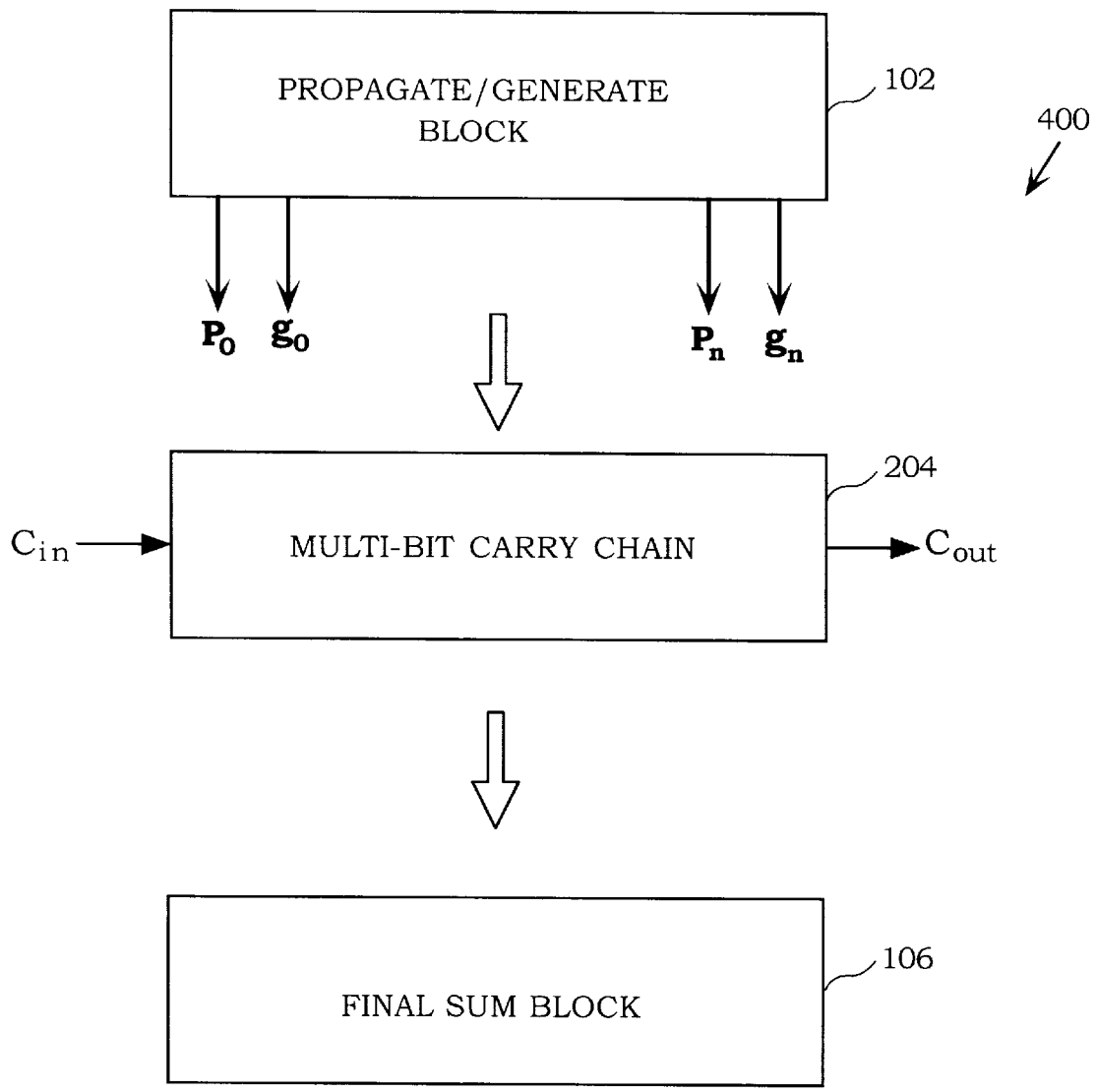
FIG. 4 illustrates a block diagram of a simple ripple carry adder, in accordance with one embodiment of the present invention.

FIG. 4 illustrates a block diagram of a simple ripple carry adder 400, in accordance with one embodiment of the present invention. The ripple carry adder will include a conventional propagate/generate block 102 that is configured to generate the appropriate propagate signals and generate signals. The propagate and generate signals will thus be communicated to the multi-bit carry chain 204 of the present invention. As mentioned above, the multi-bit carry chain 204 is preferably a standard cell which can be implemented by a synthesis tool and laid-out in an appropriate interconnected location in an integrated circuit design. The multi-bit carry chain will therefore be configured to provide the appropriate propagate and generate signals out to the final sum block 106. As mentioned above, the final sum block 106 will take the appropriate propagate and generate signals and then produce the final sum for the ripple carry adder 400.

Figure 5:
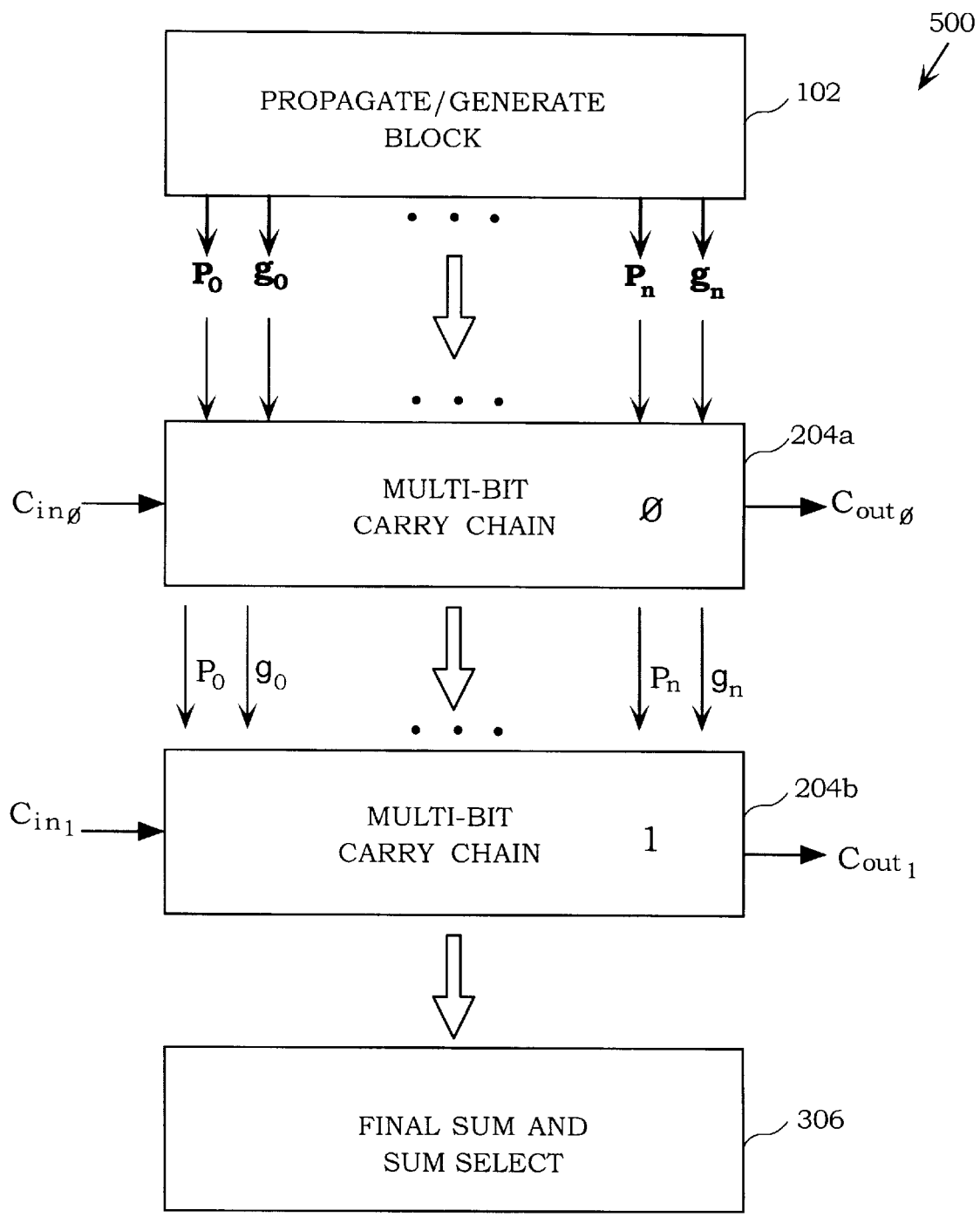
FIG. 5 illustrates a ripple carry select adder, in accordance with one embodiment of the present invention.

FIG. 5 illustrates a ripple carry select adder 500, in accordance with one embodiment of the present invention. The ripple carry select adder will also include a propagate/generate block 102 that is configured to generate the appropriate propagate and generate signals. The propagate and generate signals will then be transferred to a multi-bit carry chain φ204a which has an associated carry-in (Cin φ) signal and an appropriate carry-out signal (Cout φ). The propagate and generate signals are further communicated to a second multi-bit carry chain 1 204b. The multi-bit carry chain 1 204b will also have an associated carry-in (Cin 1) signal, and a carry-out signal (Cout 1). The data from the multi-bit carry chain φ204a and the multi-bit carry chain 1 204b will thus be transferred to the final sum and sum select block 306. At this point, any well known technique may be implemented to perform the selection of the final sum from either the multi-bit carry chain φ204a or the multi-bit carry chain 1 204b.

Figure 6A:
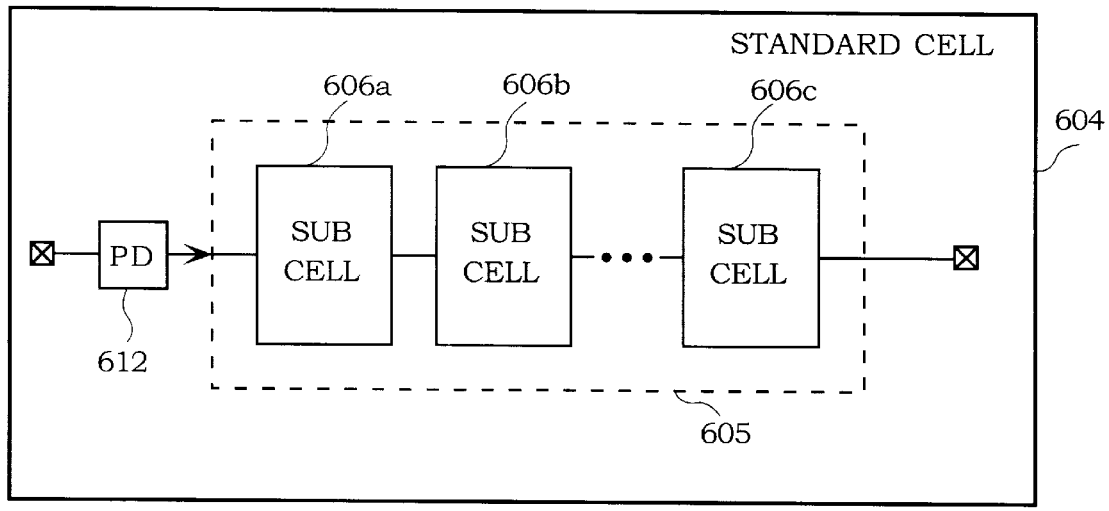
FIGS. 6A and 6B illustrate block diagrams of standard cells, in accordance with one embodiment of the present invention.
Figure 6B:
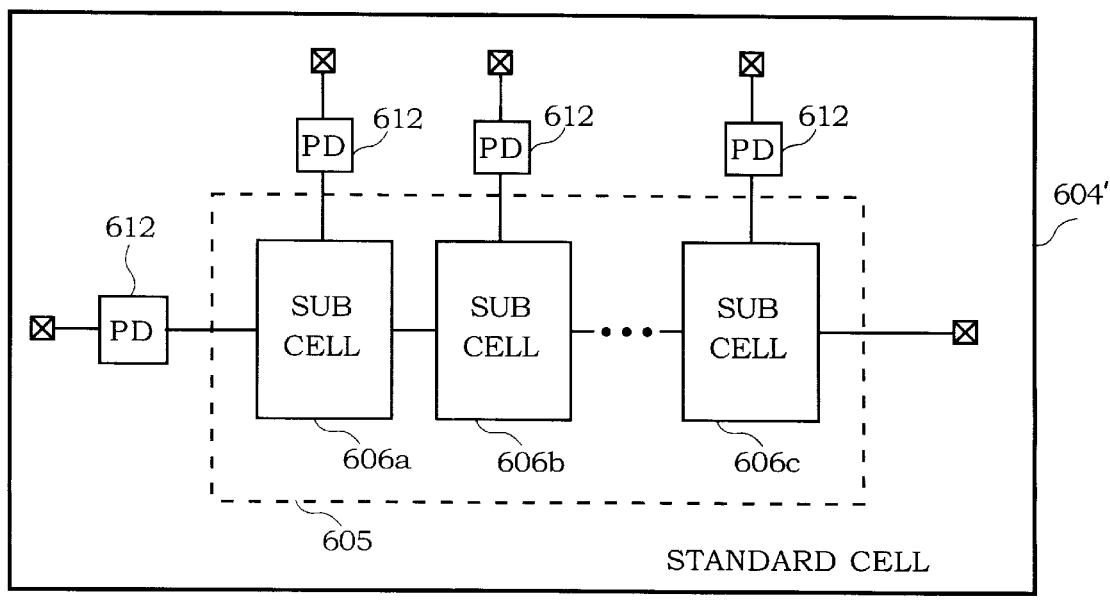

FIGS. 6A and 6B illustrate block diagrams of standard cells 604 and 604', in accordance with one embodiment of the present invention. In FIG. 6A, the standard cell 604 is shown having a plurality of sub-cells 605, each sub-cell 606a–606c is a high performance cell. To protect neighboring logic from possible charge sharing, the plurality of sub-cells 605 are provided with protection devices (PDs) 612. When the sub-cells 606a–606c are also configured to receive other signal inputs, PDs 612 will also be provided to prevent charge sharing. In this embodiment, the PDs can designed using any type of integrated circuit device, arrangement, or interconnection. Thus, although a polysilicon input (PI) gate is described to function well in isolating external logic from a high performance standard cell, it should be evident to those skilled in the art that other protection arrangements can work as well.

The block diagrams of FIGS. 6A and 6B are therefore provided to make clear that the teachings of the present invention can be applied to any type of standard cell that has two or more sub-cells that function together to provide a high performance response. In addition, the standard cell, protected in this manner, prevents the logic of neighboring standard cells from experiencing improper logical transitions. Thus, although a carry chain is a good example of a standard cell having two or more sub-cells (i.e., a bit slice) that function together, the present invention should in no way be limited to carry chain standard cells.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A standard cell, comprising:
    a plurality of sub-cells being configured to function together to generate a result, the plurality of sub-cells having at least one input;
    a protection device connected just before and to the at least one input of the plurality of sub-cells, the protection device being configured to prevent charge sharing with circuitry of another standard cell that is electrically coupled to the standard cell via the at least one input.

2. A standard cell as recited in claim 1, wherein the standard cell is a carry chain standard cell.

3. A standard cell as recited in claim 2, wherein the carry chain standard cell is one of a 2 bit carry chain, a 4 bit carry chain, an 8 bit carry chain, a 16 bit carry chain, a 32 bit carry chain, a 64 bit carry chain, a 128 bit carry chain, and a 256 bit carry chain.

4. A standard cell as recited in claim 3, wherein the carry chain is implemented in one of a ripple carry adder and a carry select adder.

5. A standard cell as recited in claim 2, wherein the result is a propagated carry.

6. A standard cell as recited in claim 2, wherein each of the plurality of sub-cells represents a bit slice of the carry chain standard cell.

7. A standard cell as recited in claim 6, further comprising:
    a plurality of generate inputs, each of the plurality of generate inputs are configured to be coupled to each of the sub-cells of the standard cell carry chain.

8. A standard cell as recited in claim 7, further comprising:
    a plurality of additional protection devices, each of the plurality of additional protection devices are configured to be connected just before and to the plurality of generate inputs, such that associated generate signals can be communicated through the plurality of additional protection devices.

9. A standard cell as recited in claim 8, wherein each of the plurality of additional protection devices are configured to prevent charge sharing with the circuitry of another standard cell that is physically coupled to the standard cell via the plurality of generate inputs.

10. A standard cell as recited in claim 1, wherein each of the plurality of sub-cells comprise:
    a first transmission gate; and
    a second transmission gate.

11. A standard cell as recited in claim 10, wherein the first transmission gate is configured to propagate a carry through a first source/drain or a first drain/source connection.

12. A standard cell as recited in claim 10, wherein the second transmission gate is configured to pass a generate signal through a second source/drain or a second drain/source connection.

13. A standard cell as recited in claim 1, wherein the standard cell is part of a library of standard cells, and the protection device is a polysilicon input gate.

14. A standard cell as recited in claim 13, wherein the library of standard cells is used by a synthesis tool to design a specific integrated circuit design.

15. A method for designing a high performance standard cell, comprising:
    designing a plurality of sub-cells that being configured to function together and generate a result, the plurality of sub-cells are interconnected in order to function together and have at least one input that is communicated through the plurality of sub-cells;
    designing a polysilicon input to be connected to and just before the at least one input of the plurality of sub-cells, the polysilicon input being configured to prevent charge sharing with circuitry that is external to the high performance standard cell and that is electrically coupled to the at least one input.

16. A method for designing a high performance standard cell as recited in claim 15, further comprising:
    designing at least one additional input to the plurality of sub-cells; and
    designing at least one additional polysilicon input for connecting just before the plurality of sub-cells, the at least one additional polysilicon input being configured to prevent charge sharing with the circuitry that is external to and electrically connected to the high performance standard cell.

17. A method for designing a high performance standard cell as recited in claim 16, further comprising:
    designing each of the plurality of sub-cells to be a bit slice of a carry chain.

18. A method for designing a high performance standard cell as recited in claim 17, further comprising:
    designing a first transmission gate and a second transmission gate for the bit slice of the carry chain.

19. A method for designing a high performance standard cell as recited in claim 18, wherein the at least one additional input to the plurality of sub-cells is a generate input.

20. A method for designing a high performance standard cell as recited in claim 15, further comprising:
    integrating the high performance standard cell into a specific integrated circuit using a synthesis tool.

21. A method for designing a high performance standard cell as recited in claim 18, wherein the specific integrated circuit is one of an ripple carry adder and a carry select adder.

22. A computer readable media containing program instructions for designing a standard cell, the computer readable media comprising:
    program instructions for designing a plurality of sub-cells that are configured to function together and generate a result, the plurality of sub-cells being interconnected in order to function together and have at least one input that is communicated through the plurality of sub-cells;
    program instructions for designing a polysilicon input to be connected to and just before the at least one input of the plurality of sub-cells, the polysilicon input being configured to prevent charge sharing with circuitry that is external to the high performance standard cell and that is electrically coupled to the at least one input.

23. A computer readable media containing program instructions for designing a standard cell as recited in claim 22, further comprising:

program instructions for designing at least one additional input to the plurality of sub-cells; and program instructions for designing at least one additional polysilicon input for connecting just before the plurality of sub-cells, the at least one additional polysilicon input being configured to prevent charge sharing with the circuitry that is external to and electrically connected to the high performance standard cell.

24. A computer readable media containing program instructions for designing a standard cell as recited in claim 23, further comprising:

program instructions for designing each of the plurality of sub-cells to be a bit slice of a carry chain.

25. A computer readable media containing program instructions for designing a standard cell as recited in claim 24, further comprising:

program instructions for designing a first transmission gate and a second transmission gate for the bit slice of the carry chain.

26. A computer readable media containing program instructions for designing a standard cell as recited in claim 25, wherein the at least one additional input to the plurality of sub-cells is a generate input.

* * * * *